United States Patent
Ando et al.

(10) Patent No.: US 8,042,564 B2
(45) Date of Patent: Oct. 25, 2011

(54) FUEL CUTOFF VALVE

(75) Inventors: Koshi Ando, Aichi-ken (JP); Miho Sato, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 275 days.

(21) Appl. No.: 12/453,747

(22) Filed: May 21, 2009

(65) Prior Publication Data

US 2009/0293962 A1    Dec. 3, 2009

(30) Foreign Application Priority Data

May 30, 2008    (JP) .................. 2008-142563

(51) Int. Cl.
*F16K 24/04*    (2006.01)
(52) U.S. Cl. ............... 137/202; 137/43; 251/118
(58) Field of Classification Search .............. 137/43, 137/202; 251/118, 127
See application file for complete search history.

(56) References Cited

U.S. PATENT DOCUMENTS

| 6,035,884 | A  | * | 3/2000 | King et al. | .................. 137/202 |
| 6,405,747 | B1 |   | 6/2002 | King et al. | |
| 6,422,261 | B1 | * | 7/2002 | DeCapua et al. | ............. 137/202 |
| 6,810,900 | B2 | * | 11/2004 | Kato | .......................... 137/202 |

FOREIGN PATENT DOCUMENTS

JP    A-08-105571    4/1996
JP    A-2005-138677    6/2005

* cited by examiner

*Primary Examiner* — Craig M Schneider
(74) *Attorney, Agent, or Firm* — Posz Law Group, PLC

(57) ABSTRACT

A fuel cutoff valve is furnished with a casing defining a valve chamber, and a float mechanism housed to be able to rise and fall in the valve chamber. The casing is furnished with a closure plate situated in the space above the valve chamber and in a facing arrangement with a connecting passage. The closure plate is furnished with a vent hole that has been formed so as to divert the passage from the connecting passage to a second pipe line, and with a barrier wall that is situated in opposition to a first pipe line and that has been formed so as to divert the passage from the first pipe line to the second pipe line.

8 Claims, 4 Drawing Sheets

FUEL CUTOFF VALVE

This application claims the benefit of and priority from Japanese Application No. 2008-142563 filed May 30, 2008, the content of which is incorporated herein by reference.

BACKGROUND OF THE INVENTION

1. Field of the Invention

The present invention relates to a fuel cutoff valve that is mounted on an upper wall of a fuel tank, and opens and closes a connecting passage to connect the fuel tank and outside, as well as to connect with another valve mechanism.

2. Description of the Related Art

A fuel tank is provided in its upper part with a fuel vapor processing system equipped with fuel cutoff valves, such as a full fuel control valve and a rollover valve, connected to a canister. Through opening and closing of the individual valves at prescribed fuel levels, venting of the fuel tank to the outside is assured while at the same time preventing liquid fuel from spilling to the outside. The rollover valve is designed to block fuel from flowing to the outside at a fuel level above full tank level in order to prevent fuel from spilling out when the vehicle tilts, during slalom driving of the vehicle, or similar situations.

In one known design, in addition to a pipe connecting it to the piping the leads to the canister, the full fuel control valve is provided with a pipe connecting it to the rollover valve, thereby allowing the piping that leads to the canister to be used in common and simplifying the piping arrangement (JP 2005-138677A). However, a problem with conventional full fuel control valves was that liquid fuel or fuel spray exiting the rollover valve tended to flow unimpeded towards the canister side.

SUMMARY

An advantage of some aspects of the invention is to provide a fuel cutoff valve that has a pipe adapted to ensure venting to another valve mechanism, and that makes it hard for liquid fuel or fuel spray inflowing from the pipe to flow to the outside.

According to an aspect of the invention is provided with a fuel cutoff valve that is mounted on an upper wall of a fuel tank, and opens and closes a connecting passage to connect the fuel tank and outside, as well as to connect with a valve mechanism. The fuel cutoff valve comprises a casing having (i) a valve chamber that connects the fuel tank and the connecting passage, (ii) a first pipe line that is connected to the valve mechanism and situated above the connecting passage, (iii) a second pipe line that is connected to the outside and situated above the connecting passage, (iv) a outside-communicating chamber that is situated in a space above the valve chamber and connect the connecting passage, the first pipe line and the second pipe line with each other, a float mechanism housed to be able to rise and fall in the valve chamber and adapted to open and close the connecting passage according to a fluid level in the fuel tank. The casing includes a closure plate that is disposed in the outside-communicating chamber and in a facing arrangement with the connecting passage, the closure plate being configured to include (i) a vent hole that is formed to divert a passage of the outside-communicating chamber, connecting between the connecting passage and the second pipe line, and (ii) a barrier wall that is situated in a facing arrangement with the first pipe line and that is formed to divert a passage of the outside-communicating chamber, connecting between the first pipe line and the second pipe line.

When fuel is supplied to a fuel tank employing the fuel cutoff valve in accordance with the first mode, fuel vapors in the upper part of the fuel tank will collide with the closure plate from the valve chamber and the connecting passage, becoming diverted thereby and escaping to the outside through the vent hole of the closure plate and the second pipe line. When the fuel in the fuel tank then reaches a prescribed level, the float mechanism will ascend through buoyancy owing to the inflow of fuel into the valve chamber. Due to the ascent of the float mechanism, the connecting passage will be closed off by the upper part of the float mechanism, thus blocking communication of the fuel tank with the outside and preventing fuel from flowing out from the fuel tank.

During turning or braking of the vehicle, if the fuel level in proximity to the fuel cutoff valve should rise causing liquid fuel or fuel spray to flow out from the connecting passage, the outflowing fuel will collide with the closure plate which has been situated in a facing arrangement with the connecting passage, and will be returned thereby. Moreover, because the vent hole of the closure plate has been formed at a location that does not face the connecting passage, i.e. because it has been formed so as to divert from the connecting passage to the second pipe line, liquid fuel or fuel spray will be prevented from flowing out from the second pipe line.

Additionally, the first pipe line which has been formed in the casing is connected to another valve mechanism, ensuring venting to the outside through the second pipe line. If liquid fuel or fuel spray from the other valve mechanism flows out from the first pipe line, the barrier wall formed on the closure plate will block inflow to the second pipe line and divert the passage that leads to the second pipe line. Therefore, liquid fuel etc. outflowing from the first pipe line will not head directly into the second pipe line.

In a second mode of the present invention, the vent hole is arranged facing the barrier wall and situated such that liquid fuel or fuel spray outflowing from the first pipe line will be directed towards the valve chamber. Through this arrangement, when fuel outflowing from the first pipe line collides with the barrier wall, it will be directed towards the valve chamber through the vent hole, so that the amount of outflowing fuel can be reduced.

In a third mode of the present invention, the barrier wall is disposed rising up from the closure plate so as to incline towards the vent hole. With this arrangement, the effect of directing the first pipe line towards the vent hole can be enhanced.

In a fourth mode of the present invention, the closure plate has a circular projecting portion projected upward in a facing arrangement with the connecting passage. With this arrangement, fuel outflowing from the connecting passage will collide with the circular projecting portion and be returned, preventing it from flowing to the outside.

In a fifth mode of the present invention, the closure plate has a sloping face that slopes towards the vent hole from the perimeter of the closure plate. With this arrangement, liquid fuel that has condensed in the outside-communicating chamber will not accumulate there, and will be rapidly returned to the fuel tank through the vent hole.

These and other objects, features, aspects, and advantages of the present invention will become more apparent from the following detailed description of the preferred embodiments with the accompanying drawings.

BRIEF DESCRIPTION OF THE DRAWINGS

DESCRIPTION OF THE PREFERRED EMBODIMENTS (1) General Configuration of Fuel Tank Venting Device FIG. 1 is an illustration depicting a fuel tank venting device equipped with a fuel cutoff valve in accordance with an embodiment of the present invention. The fuel tank venting device is furnished with a fuel cutoff valve 10 (full fuel control valve) and a rollover valve ROV (valve mechanism) of so-called 'outside-tank' design mounted on the upper wall inside a flattened fuel tank FT; a canister CN; and connector pipes connecting these. The fuel cutoff valve 10 is a valve designed to close when the fuel level inside the fuel tank FT has reached a first level FL1 during fueling. The rollover valve ROV is a valve that is situated so as to ensure venting to the outside even if the vehicle should tilt, and that is designed to close when the fuel level has reached a second level FL2 that is higher than the first level FL1. These valves serve to ensure venting of the fuel tank FT to the outside, as well as to prevent fuel from spilling out.

FIG. 2 is a plan view of the fuel cutoff valve 10; In FIG. 3, the fuel tank FT is made of composite resin material that includes polyethylene on its surface, and has a mounting hole FTb formed on the tank upper wall FTa. The fuel cutoff valve 10 is mounted to this tank upper wall FTa by thrusting its bottom part into the mounting hole FTb.

Figure 1:
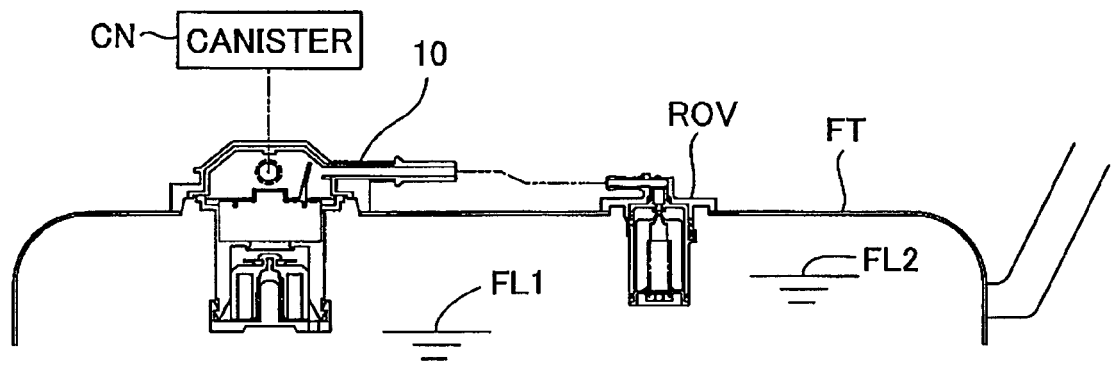
FIG. 1 shows a fuel tank venting device equipped with a fuel cutoff valve in accordance with an embodiment of the present invention.

(2) Configuration of Fuel Shutoff Valve 10 Parts

The fuel cutoff valve 10 is composed mainly of a casing 20, a float mechanism 50, and a spring 58. The casing 20 is furnished with a case body 30, a closure plate 35, a cover 40, and a base plate 45; the space bounded by the lower part of the case body 30 and the base plate 45 constitutes a valve chamber 30S, and the float mechanism 50, which is supported on the spring 58, is housed in this valve chamber 30S. An outside-communicating chamber 40S is provided above the valve chamber 30S, and the closure plate 35 is situated in this outside-communicating chamber 40S.

Figure 4:
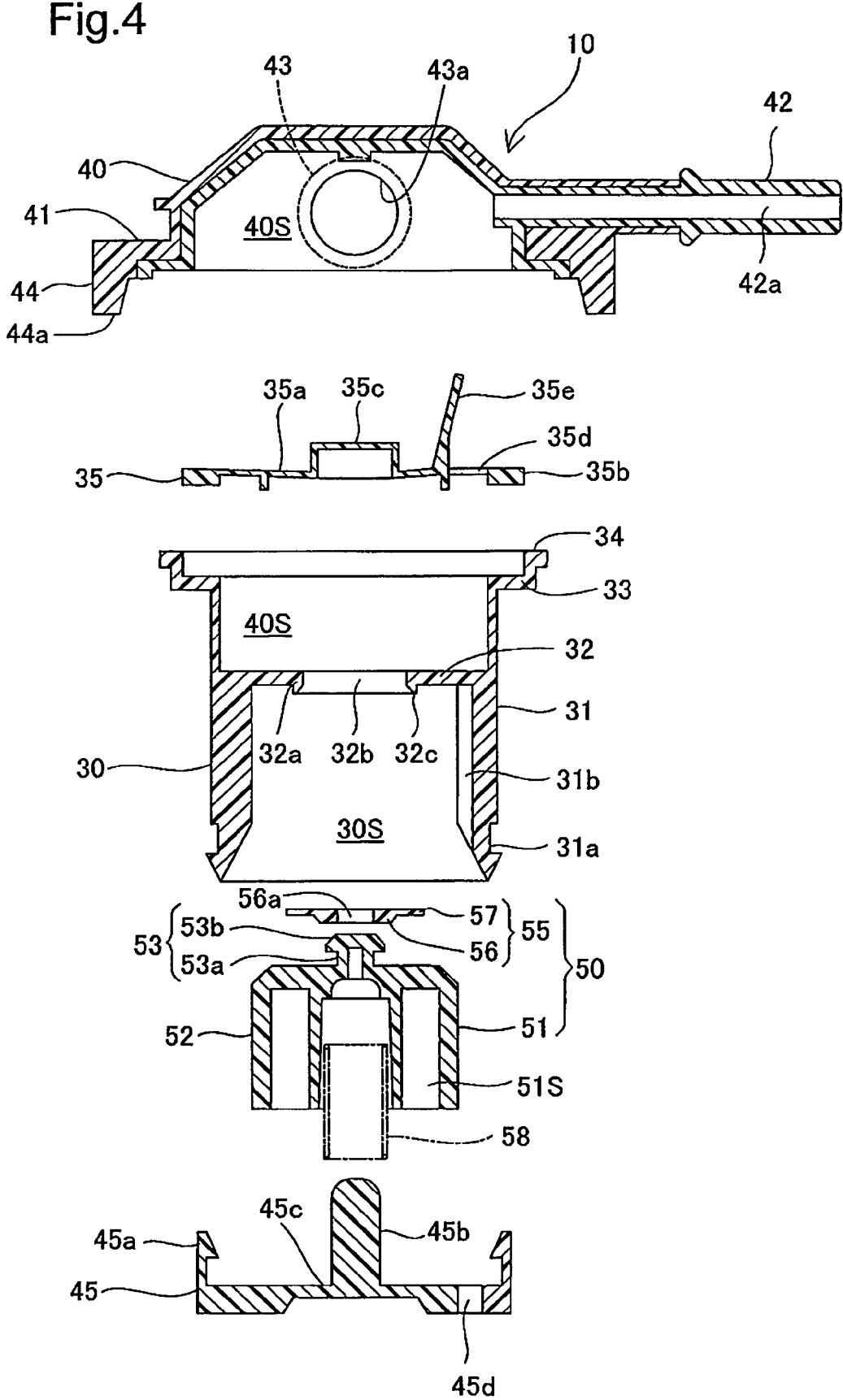
FIG. 4 is an exploded sectional view of the fuel cutoff valve.

FIG. 4 is an exploded sectional view of the fuel cutoff valve 10. The case body 30 is formed by a side wall 31 and a partition wall 32 that has been formed substantially at the center of the side wall 31, with the space below the partition wall 32 constituting the valve chamber 30S, and the space above, defined in cooperation with the cover 40, constituting the outside-communicating chamber 40S. A flange 33 projects in the diametrical direction from the upper part of the side wall 31, and a joining portion 34 is formed in the upward direction from the outside peripheral part of the flange 33. The upper face of the flange 33 is a section adapted to receive welding of the outside peripheral part of the closure plate 35, while the joining portion 34 is a section adapted to be welded to the cover 40. An engaging hole 31a is formed in the lower part of the side wall 31. The engaging hole 31a is used for attaching the base plate 45, as will be described later. A guide projection 31b for guiding the float mechanism 50 is formed in the vertical direction along the inside peripheral part of the side wall 31.

A passage-defining projection 32a that projects towards the bottom is formed in the center of the partition wall 32; and a connecting passage 32b that connects to the valve chamber 30S is formed passing through this passage-defining projection 32a. The valve chamber 30S side of the connecting passage 32b constitutes a seal portion 32c of annular shape. An engaging hook 45a adapted to engage the engaging hole 31a of the case body 30 is formed in the base plate 45 side. Through engagement of the engaging hook 45a in the engaging hole 31a, the base plate 45 is attached so as to provide closure to the bottom opening of the case body 30. A projecting portion 45b of circular post shape is formed in the center part of the base plate 45, and a spring supporting portion 45c is formed in the outside peripheral part thereof. The spring supporting portion 45c is adapted to receive the spring 58 and to support the spring 58 between it and the inside lower face of the float mechanism 50. Communication holes 45d (only one is illustrated) are formed at four locations encircling the projecting portion 45b. The communication holes 45d connect the fuel tank FT interior with the valve chamber 30S.

Figure 5:
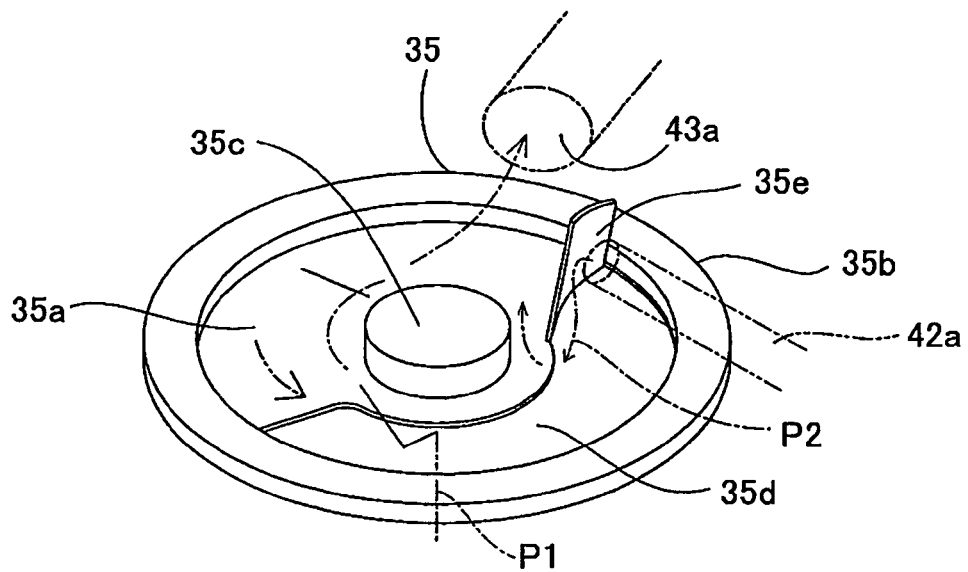
FIG. 5 is a perspective view depicting the closure plate.

FIG. 5 is a perspective view depicting the closure plate 35. The closure plate 35 is furnished with a closure plate body 35a of circular disk shape sloping towards the center part; its outside peripheral part constitutes a retaining edge 35b intended for welding to the flange 33, and its center part constitutes a circular projecting portion 35c. The circular projecting portion 35c serves as a grip during assembly of the fuel cutoff valve 10, and also has the action of returning spray of fuel that has been sprayed out through the connecting passage 32b. A vent hole 35d is formed to the outside peripheral side of the circular projecting portion 35c. The vent hole 35d has arcuate contours of prescribed width, that is, it extends along substantially half the circumference at a location exclusive of the retaining edge 35b and the circular projecting portion 35c. A barrier wall 35e rises up from the closure plate body 35a at a diametrical edge of the vent hole 35b. The barrier wall 35e is formed at an upward incline towards the vent hole 35d, and as will be discussed later functions to direct liquid fuel and fuel spray towards the vent hole 35d.

Figure 2:
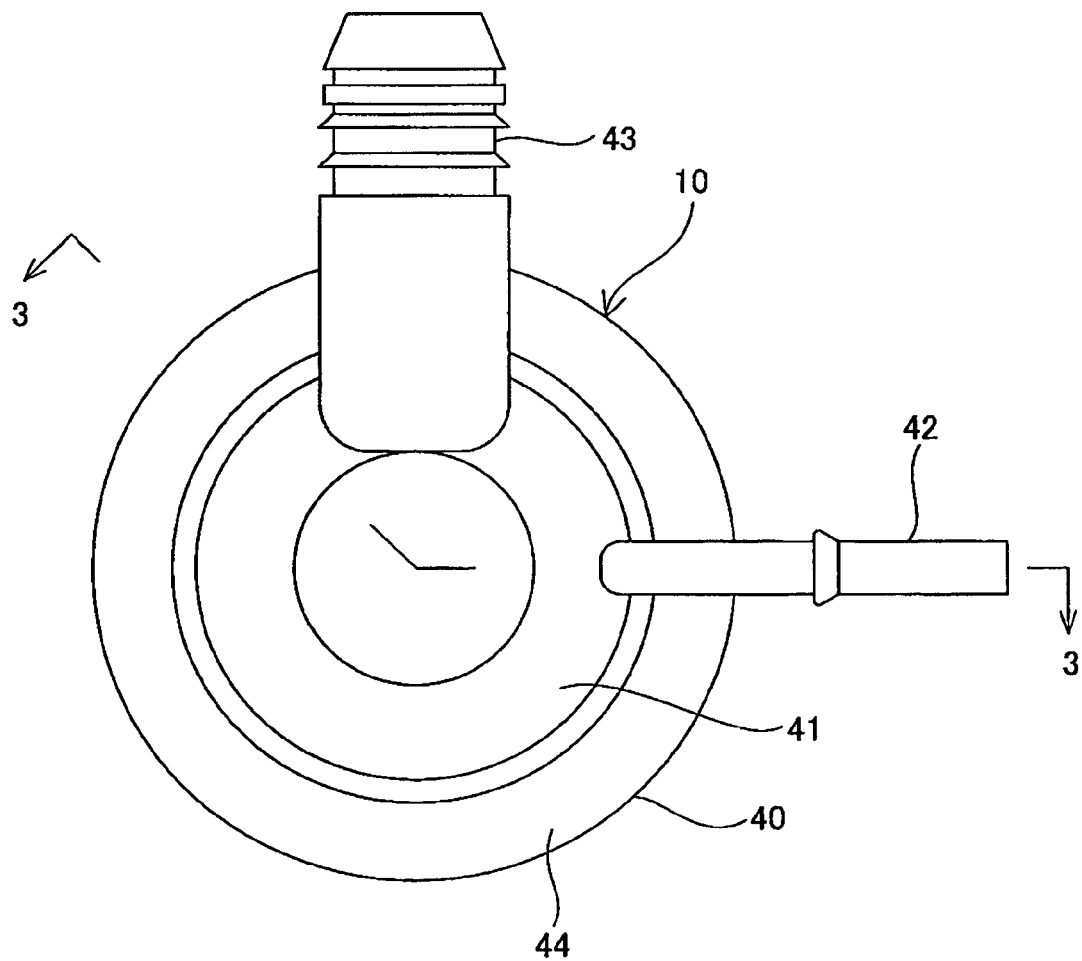
FIG. 2 is a plan view of the fuel cutoff valve shown mounted on the top of an automobile fuel tank in accordance with an embodiment of the present invention.

In FIG. 4, the cover 40 is furnished with a cover body 41, a first pipe part 42 that projects out to the side from the center of the cover body 41, a second pipe part 43 (see FIG. 2) that is positioned at a right angle to the first pipe part 42, and a flange 44 that is formed at the perimeter of the cover body 41, these components being integrally formed. A first pipe line 42a is defined to the inside of the first pipe part 42; this first pipe line 42a connects at one end to the outside-communicating chamber 40S, and at the other end connects to the rollover valve ROV (FIG. 1) through a pipe line. Inside the second pipe part 43 there is defined a second pipe line 43a of larger passage area than the first pipe line 42a and extending in the perpendicular direction (see FIG. 2); the second pipe line 43a connects at one end to the outside-communicating chamber 40S, and at the other end connects to the canister (FIG. 1) through a pipe line. Here, passage leading from the connecting passage 32b to the second pipe line 43a will be obstructed by the closure plate 35 as indicated by symbol P1 in FIG. 5 and diverted to the vent hole 35d, and will circle around the circular projecting portion 35c to connect with the second pipe line 43a that connects to the canister. The passage leading from the first pipe line 42a to the second pipe line 43a will be obstructed and diverted by the barrier wall 35e as indicated by symbol P2, and will circle around the circular projecting portion 35c to connect with the second pipe line 43a.

An outside welding portion 44a adapted for welding to the tank upper wall FTa of the fuel tank FT is formed on the lower end of the flange 44.

The float mechanism 50 is furnished with a float 51, and a rubber seal member 55 that is installed on top of the float 51. The float 51 is furnished with a float body 52 that has a buoyancy chamber 51S open at the bottom and divided into multiple sections; and a valve supporting portion 53 that is projected up from the top center of the float body 52. The valve supporting portion 53 is furnished with a supporting basal portion 53a of circular post shape projecting from the center part of the float 51, and a detent portion 53b that splays out from the top of the supporting basal portion 53a.

The seal member 55 is furnished with a mounting part 56 having a mounting hole 56a; and a seal part 57 of circular disk shape formed in the outside peripheral portion of the mounting part 56. These components have been integrally molded of rubber. With this arrangement, the mounting hole 56a of the mounting part 56 will be slipped around the supporting basal portion 53a and detained there by the detent portion 53b so that the seal member 55 is supported on the valve supporting portion 53.

The float 51 will be supported by the spring 58, which has been installed between the upper face of the buoyancy chamber 51S of the float 51 and the spring supporting portion 45c of the base plate 45.

(3) Operation of Fuel Shutoff Valve 10

Figure 3:
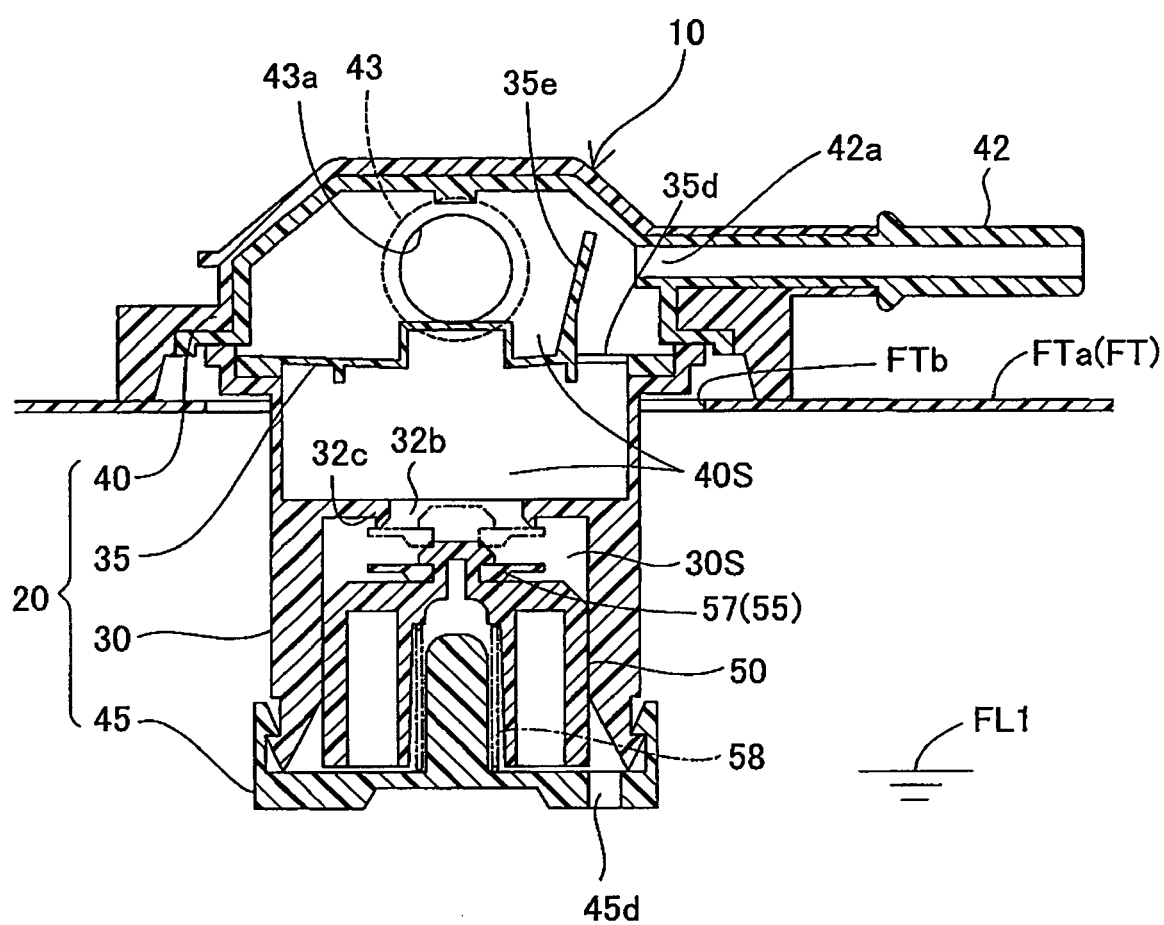
FIG. 3 is a sectional view taken along line 3-3 in FIG. 2.

Operation of the fuel cutoff valve 10 will now be described. As depicted in FIG. 3, when the fuel tank FT is supplied with fuel by fueling, fuel vapors in the upper part of the fuel tank FT will rise through the valve chamber 30S and the connecting passage 32b to collide with the closure plate 35, then be diverted to escape towards the canister through the vent hole 35d, the outside-communicating chamber 40S, and the second pipe line 43a. Then, when the fuel level in the fuel tank reaches a first level FL1, the fuel will now block off the communication holes 45d, and thus tank internal pressure inside the fuel tank FT will rise. This rise in tank internal pressure will activate the auto-stop function of the fuel gun to stop fueling. In this state, a large pressure differential will arise between the tank internal pressure and the pressure inside the valve chamber 30S, and the fuel level inside the valve chamber 30S will rise. When the fuel level inside the valve chamber 30S reaches a prescribed height, depending on the balance between the buoyancy of the float mechanism 50 and the upward force produced by the load of the spring 58 on the one hand, and the downward force produced by the weight of the float mechanism 50, when the former overcomes that latter the float mechanism 50 will rise, and the seal part 57 of the seal member 55 will become seated in the seal portion 32c, thereby closing off the connecting passage 32b. Thus, during fueling of the fuel tank FT, fuel vapors will be allowed to escape from the fuel tank FT, while also preventing fuel from spilling to the outside of the fuel tank FT.

(4) Working Effects of the Embodiment

The embodiment described above affords the following working effects.

(4)-1 During fueling, when the fuel level in the fuel tank FT exceeds a first level FL1 at which the communication holes 45d are blocked off, tank internal pressure of the fuel tank FT will rise so that the auto-stop function can be activated.

(4)-2 If during turning or braking of the vehicle the fuel level in proximity to the fuel cutoff valve 10 should rise causing liquid fuel or fuel spray to flow out from the connecting passage 32b, the outflowing fuel will collide with the closure plate 35 which has been situated in a facing arrangement with the connecting passage 32b, and will be returned thereby. Moreover, because the vent hole 35d of the closure plate 35 has been formed at a location that does not face the connecting passage 32b, i.e. because it has been formed so as to divert from the connecting passage 32b to the second pipe line 43a, liquid fuel or fuel spray will be prevented from flowing out from the second pipe line 43a.

Figure 6:
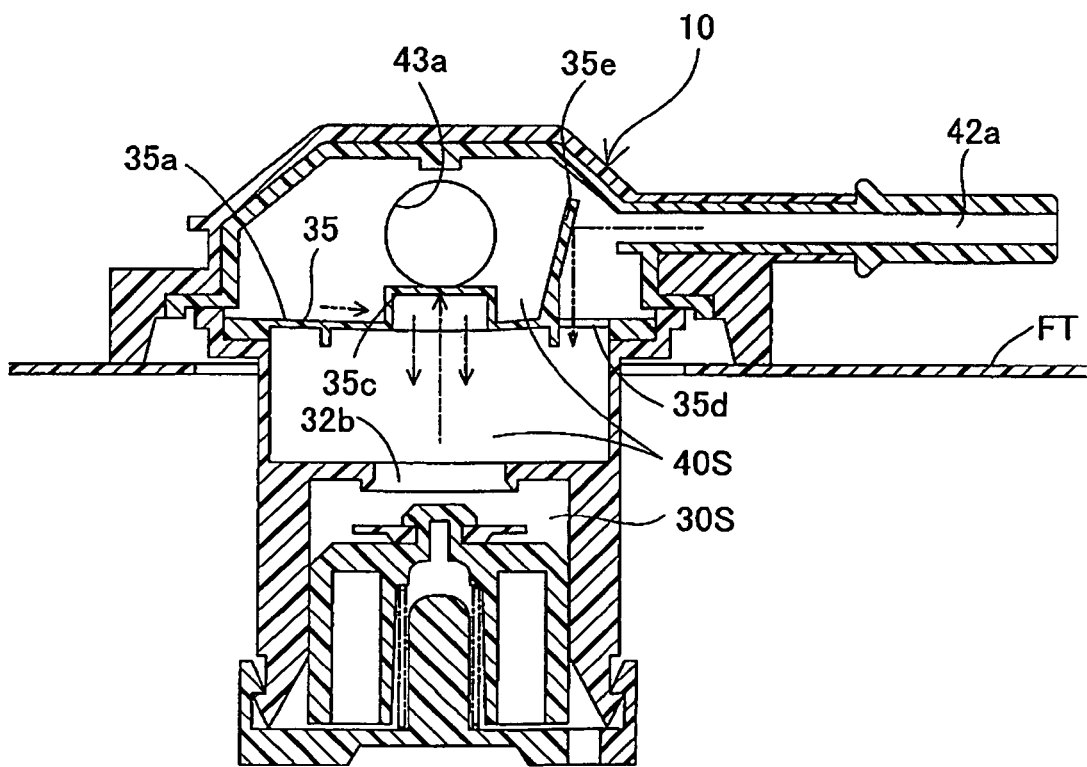
FIG. 6 shows operation of the fuel cutoff valve.

(4)-3 As depicted in FIG. 6, the first pipe line 42a is connected to the other rollover valve ROV (FIG. 1) so as to ensure venting to the canister through the outside-communicating chamber 40S and the second pipe line 43a. If liquid fuel or fuel spray from the rollover valve ROV flows out from the first pipe line 42a, the barrier wall 35e formed on the closure plate 35 will block inflow to the second pipe line 43a, and divert the passage that leads to the second pipe line 43a. Therefore, liquid fuel etc. that has outflowed from the first pipe line 42a will not head directly into the second pipe line 43a.

(4)-4 The barrier wall 35e is positioned on an incline such that liquid fuel or fuel spray outflowing from the first pipe line 42a will be directed through the vent hole 35d and towards the valve chamber 30S, so when fuel outflowing from the first pipe part 42A collides with it, the fuel will be directing towards the vent hole 35d, reducing the amount of outflowing fuel.

(4)-5 The circular projecting portion 35c of the closure plate 35 is situated in a facing arrangement with the connecting passage 32b, whereby fuel outflowing from the connecting passage 32b will be returned to the valve chamber 30S and prevented from flowing to the outside.

(4)-6 As depicted in FIGS. 5 and 6, the closure plate body 35a of the closure plate 35 has a sloping face that slopes towards the vent hole 35d from the perimeter, whereby liquid fuel that has condensed in the outside-communicating chamber 40S will not accumulate there, but will be rapidly returned to the fuel tank through the vent hole 35d.

The present invention is not limited to the embodiment set forth hereinabove, and may be embodied in various modes without departing from the spirit thereof, as shown for example by the following modified embodiment.

The fuel cutoff valve 10 in accordance with the embodiment hereinabove has been designed so that when the fuel level has reached the bottom end of the fuel cutoff valve 10, the float mechanism will rise due to fuel drawn into the valve chamber through the siphon effect, but no particular limitation is imposed thereby, and any design whereby the float will to rise and fall according to the liquid level in the valve chamber depending on the liquid level in the fuel tank would be acceptable.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel cutoff valve that is mounted on an upper wall of a fuel tank, and opens and closes a connecting passage to connect the fuel tank and outside, as well as to connect with a valve mechanism, the fuel cutoff valve comprising:

a casing having (i) a valve chamber that connects the fuel tank and the connecting passage, (ii) a first pipe line that is connected to the valve mechanism and situated above the connecting passage, (iii) a second pipe line that is connected to the outside and situated above the connecting passage, (iv) an outside-communicating chamber that is situated in a space above the valve chamber and connect the connecting passage, the first pipe line and the second pipe line with each other, a float mechanism housed to be able to rise and fall in the valve chamber and adapted to open and close the connecting passage according to a fluid level in the fuel tank, wherein the casing includes a closure plate that is disposed in the outside-communicating chamber and in a facing arrangement with the connecting passage, the closure plate being configured to include (i) a vent hole that is formed to divert a passage of the outside-communicating chamber, connecting between the connecting passage and the second pipe line, and (ii) a barrier wall that is situated in a facing arrangement with the first pipe line and that is formed to divert a passage of the outside-communicating chamber, connecting between the first pipe line and the second pipe line, and the vent hole is arranged facing the barrier wall and situated to direct liquid fuel and fuel spray outflowing from the first pipe line towards the valve chamber.

2. The fuel cutoff valve in accordance with claim 1, wherein
the barrier wall is disposed rising up from the closure plate so as to incline towards the vent hole.

3. The fuel cutoff valve in accordance with claim 2, wherein
the closure plate has a circular projecting portion that is projected upward and situated in a facing arrangement with the connecting passage.

4. The fuel cutoff valve in accordance with claim 3, wherein
the closure plate has a sloping face that slopes towards the vent hole from an outer circumference of the closure plate.

5. The fuel cutoff valve in accordance with claim 1, wherein
the closure plate has a circular projecting portion that is projected upward and situated in a facing arrangement with the connecting passage.

6. The fuel cutoff valve in accordance with claim 1, wherein
the closure plate has a sloping face that slopes towards the vent hole from an outer circumference of the closure plate.

7. A fuel cutoff valve that is mounted on an upper wall of a fuel tank, and opens and closes a connecting passage to connect the fuel tank and outside, as well as to connect with a valve mechanism, the fuel cutoff valve comprising:
a casing having (i) a valve chamber that connects the fuel tank and the connecting passage, (ii) a first pipe line that is connected to the valve mechanism and situated above the connecting passage, (iii) a second pipe line that is connected to the outside and situated above the connecting passage, (iv) an outside-communicating chamber that is situated in a space above the valve chamber and connect the connecting passage, the first pipe line and the second pipe line with each other, a float mechanism housed to be able to rise and fall in the valve chamber and adapted to open and close the connecting passage according to a fluid level in the fuel tank, wherein the casing includes a closure plate that is disposed in the outside-communicating chamber and in a facing arrangement with the connecting passage, the closure plate being configured to include (i) a vent hole that is formed to divert a passage of the outside-communicating chamber, connecting between the connecting passage and the second pipe line, and (ii) a barrier wall that is situated in a facing arrangement with the first pipe line and that is formed to divert a passage of the outside-communicating chamber, connecting between the first pipe line and the second pipe line, and wherein the closure plate has a circular projecting portion that is projected upward and situated in a facing arrangement with the connecting passage.

8. A fuel cutoff valve that is mounted on an upper wall of a fuel tank, and opens and closes a connecting passage to connect the fuel tank and outside, as well as to connect with a valve mechanism, the fuel cutoff valve comprising:
a casing having (i) a valve chamber that connects the fuel tank and the connecting passage, (ii) a first pipe line that is connected to the valve mechanism and situated above the connecting passage, (iii) a second pipe line that is connected to the outside and situated above the connecting passage, (iv) an outside-communicating chamber that is situated in a space above the valve chamber and connect the connecting passage, the first pipe line and the second pipe line with each other, a float mechanism housed to be able to rise and fall in the valve chamber and adapted to open and close the connecting passage according to a fluid level in the fuel tank, wherein the casing includes a closure plate that is disposed in the outside-communicating chamber and in a facing arrangement with the connecting passage, the closure plate being configured to include (i) a vent hole that is formed to divert a passage of the outside-communicating chamber, connecting between the connecting passage and the second pipe line, and (ii) a barrier wall that is situated in a facing arrangement with the first pipe line and that is formed to divert a passage of the outside-communicating chamber, connecting between the first pipe line and the second pipe line, and wherein the closure plate has a sloping face that slopes towards the vent hole from an outer circumference of the closure plate.

* * * * *